United States Patent Office 3,056,725
Patented Oct. 2, 1962

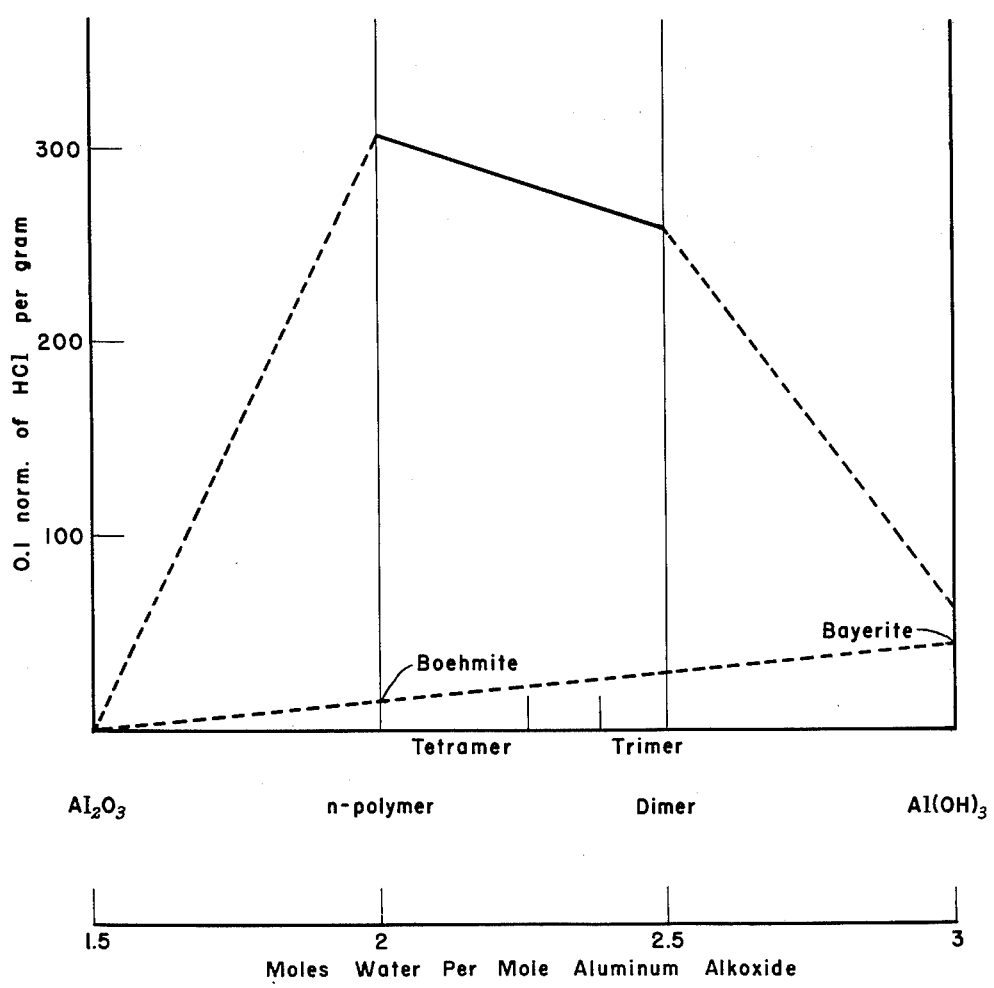

3,056,725
POLYMERIC ALUMINUM OXIDE HYDROXIDES
Jacobus Rinse and Abraham Jan Dontje, Bernardsville, N.J., assignors, by mesne assignments, to Agrashell, Incorporated, Los Angeles, Calif., a corporation of Delaware
Filed June 16, 1959, Ser. No. 820,606
13 Claims. (Cl. 167—55)

This invention relates to the production of polymeric aluminum oxide hydroxides or hydroxy aluminum oxide polymers, and to such compounds as new compositions of matter. The processes involve the hydrolysis of aluminum alcoholates with water under unique procedures and conditions which form hydroxides, instead of hydrates, of aluminum.

According to a patented disclosure, aluminum alcoholates are hydrolyzed with water under various procedures and conditions leading to the production of boehmite, alpha alumina monohydrate, or of bayerite, alumina trihydrate, or mixtures of the same, all of which are crystalline in structure. In the patented process the boehmite products are preferably thereafter activated by heating to 900°–1400° F. to convert the same to eta alumina thereby to provide a product suitable for supporting catalysts for use in the hydroforming of hydrocarbons.

An object of the instant invention is to provide a new class of alumina compounds having new properties valuable in different fields and more satisfactory in some known fields.

A specific object is to provide a new class of compounds having utility as pharmaceutical anti-acids.

The hydroxy aluminum oxide polymers of the invention may be illustrated by the formulas:

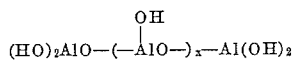

wherein $x=0-100$ or more and,

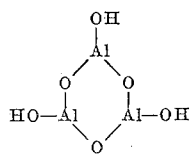

As produced these polymers are fine white amorphous powders of exceptionally high surface area as well as high resistance to sintering. They are easily soluble in weak mineral acid solutions, as in 0.1 normal hydrochloric acid and in acetic and oleic acid and other organic acids.

Broadly considered, the processes of the invention may be described as methods for the production of polymeric aluminum oxide hydroxides from aluminum alcoholates or alkoxides through reaction with specific amounts of water in two successive stages in each of which the alcoholate and the water are brought together in such manner as to provide thorough dispersion of the water in the alcoholate and its reaction in such manner that local areas of water in excess of the desired combining proportions are avoided as far as is practicable. This end is furthered by correlated combinations of conditions and procedures requiring careful attention particularly during the first stage reaction, such as the use of solvents in substantial amounts for either or both of the reactants, slow rates of addition of the water to the alcoholate, highly efficient mixing and dispersing operations and elevated temperatures of the reactants at the time of mixing and of the reacting mass.

The first step of the reaction involves the addition of 0.5–1 mol of water per mol of aluminum compound and heating until the formation of a polymeric aluminum oxide alcoholate is complete. The second step involves the addition of more water in an amount which provides a total of from 2 to about 2.5 mols per mol of aluminum compound which amount will replace the remaining alcoholate groups, and continuing the heating of the resulting mixture at a temperature and until the alcoholate groups have been liberated as hydroxy hydrocarbons, the temperature being ultimately raised to a level which evaporates off the liberated hydroxy hydrocarbons and as well any other such compound which may have been used as a solvent.

The aluminum alcoholates to which the present invention is applicable are those derived from alcohols or hydroxy hydrocarbons which are sufficiently volatile to permit their vaporization (with the aid of a vacuum if necessary) when they are regenerated during the reaction and to permit their removal from the final reaction mass without decomposition or alteration of the aluminum product formed by the reaction. Aluminum alcoholates of lower molecular weight hydrocarbons as a class can be employed, but those alcohols having from 2–5 carbon atoms are preferred.

In carrying out the process of the present invention, the aluminum alcoholate or alkoxide and the water are best reacted in a dispersed system. This dispersion is preferably obtained by utilizing a solvent providing mutual solution of the reactants and preferably by dissolving the two reactants separately before they are mixed. Any inert solvent may be employed but lower molecular alcohols and relatively volatile liquid hydrocarbons such as benzine, toluene and xylene may be employed. With solvents of proper volatility, the reaction can for the most part be carried out during refluxing. In place of refluxing, pressure can be employed during the reaction, if this procedure is desired for any special reason.

The aluminum alcoholate after being mixed with the low boiling solvent is heated to a temperature above 60° C. and preferably to the boiling point of the solvent under reflux. The amount of solvent required depends on the mixing procedures and temperatures employed but an amount at least equal to half the weight of the alcoholate should be employed. During refluxing of this solution, water or steam is slowly introduced into the boiling mass during constant agitation, the water or steam being preferably in admixture with a lower boiling alcohol, most suitably, the same alcohol as that from which the alcoholate was produced.

The amount of water introduced is a critical feature of the invention and in this initial stage may be varied only between approximately 0.5 mol and 1 mol per mol of aluminum compound present. The water acts as a condensing agent for the aluminum alcoholate molecules and brings about the formation of polymeric aluminum oxide alcoholates. The amount added betwen these limits determines the number of units in the polymeric product formed provided the time of reaction is sufficient to cause completion of the polymerization reaction. Upon completion of the addition of the water, the reaction mass is refluxed until reaction ceases, a period of at least 30 minutes usually being required. At this time the polymerization reaction is complete and the aluminum oxide, alkoxide polymer has formed.

Thereupon, additional water or steam, also preferably dissolved in a lower molecular alcohol, is introduced into the reaction mass during continuation of the heating and agitation. As in the initial reaction an excessive rate of water introduction can be avoided, and an optimum rate determined by tests involving observation of the reaction mass and introducing the water at a rate which avoids the formation of any lumps. The quantity required lies between 2 and 1 mols per mol of aluminum compound present. The total amount of water introduced lies between about 2 and 2½ mols per mol of aluminum compound. The water may be used in a slight excess or about 10% without hydrolyzing the product.

To produce dimeric aluminum oxide tetra-oxide, ½ mol of water is added during the first stage and 2 mols are added to the intermediate product. By adding more of the water in the first stage higher linear polymers are formed, and less water is needed in the second stage to hydrolyze all of the remaining alkoxy groups.

During the second stage reaction, the heating is continued at the elevated temperature of 60° C. or higher, and after a short time the temperature may be increased, if necessary, to distill off the liberated alcohol and any alcohol solvent present. To accomplish removal of the alcohol, the mass is most suitably heated under vacuum to a temperature of from 90°–170° C. Upon completion of the distillation the aluminum products will be found to contain only a very small quantity of alkoxy groups or below 2% of the weight of the product.

Although the hereinbefore described method of bringing the water and the aluminum alcoholate together is most practical, variations in the process can be made provided the mixing and reaction is accomplished in such manner as to avoid an excess of water molecules in contact with the aluminum alcoholate molecules. It is, for example, at least theoretically possible to mix the water and the alcoholate at room temperature in such manner as to obtain complete distribution of the former throughout the latter and then to bring about reaction quickly thereafter by heating.

It is also possible in the first stage to eliminate the period of heating after all the water has been introduced, but when this procedure is followed and the water is added continuously from one stage through the next, the condensation will proceed irregularly and the product ultimately obtained will be composed of a mixture of a large number of polymers. The intermediate products will be in the polymerizing stage and the further introduction of water will stop the polymerizing reaction and react with the end groups.

*Example 1*

Aluminum isopropoxide in a quantity of 204 grams is dissolved in 200 grams of isopropanol and heated to 80° C. Thereupon a solution of 9 grams of water in 90 grams of isopropanol are introduced slowly into the isopropoxide solution during agitation, the isopropanol being refluxed. The heating under reflux is continued for a period of about 1 hour. Thereupon 36 grams of water dissolved in 60 grams of isopropanol are introduced during agitation. After continuing the heating and refluxing for 30 minutes, the solvent is distilled off as the temperature is gradually raised to 140° C. When the distillation is complete, a product is obtained which is a white powder and is di-aluminum oxide tetrahydroxide. It has an acid binding value of 263 cc. 0.1 normal hydrochloric acid solution per gram of the product. The reaction appears to proceed as follows:

(1) $2Al(OR)_3 + H_2O \rightarrow (RO)_2AlOAl(OR)_2 + 2ROH$
(2) $(RO)_2AlOAl(OR)_2 + 4H_2O \rightarrow (HO)_2AlOAl(OH)_2 + 4ROH\uparrow$

*Example 2*

Aluminum sec. butoxide in a quantity of 246 grams is dissolved in 300 grams of toluene and heated to 110° C. Thereupon a solution of 18 grams of water in 100 grams of butanol is slowly added. The heating under reflux is continued for 1 hour after which another 18 grams of water dissolved in 60 grams of butanol is slowly added. The heating under reflux is continued for 1 hour and then the liberated solvent and the added solvent are removed by distillation at a final temperature of 140° C. The white powder product obtained is a hydroxy aluminum oxide polymer of an undetermined number of aluminum oxide groups. It has an acid binding value of 310. The reaction may be described by the following equation:

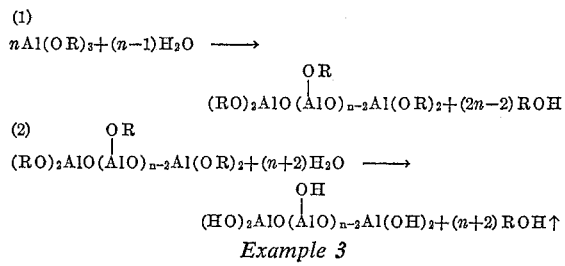

*Example 3*

Cyclic trimer aluminum isopropoxide $(OAlOC_3H_7)_3$ in a quantity of 102 grams prepared in accordance with the process described in copending application Serial No. 745,334 is heated to 80° C. in isopropanol. Into this hot mass a vaporized mixture of 18 grams of water and 18 grams of isopropanol is introduced during vigorous agitation. After being heated for 30 minutes at 80° C. the reaction mass in the vessel is subjected to a vacuum until no more distillate comes off. The product produced is a cyclic aluminum oxide hydroxide trimer of the formula $(OAlOH)_3$. Its acid binding value is 330.

*Example 4*

The process of Example 1 was repeated except that the initial quantity of water added was 12 grams and the additional water added during the second stage amounted to 30 grams. With this change the white powdered product finally obtained possessed an acid binding value of 270, this product being tri-aluminum oxide pentahydroxide. The reaction appears to proceed as follows:

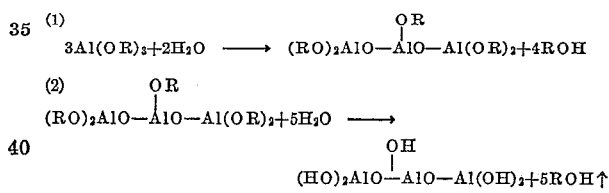

The product of this example was determined to have a surface area of 660 m.² per gram. Boehmite or alpha aluminum monohydrates as described in the literature, have a surface area of from 100 to 400 m.².

The acid binding values of the products of the examples are illustrated in the drawing which shows a graph where the values of the various linear polymers are compared with each other and also contrasted with the values of conventional aluminum oxide and hydrated aluminum oxide compounds, the latter being superimposed on the graph.

The products of the invention are useful generally for the formation of aluminum soaps, as catalysts for dehydration and dehydrogenation of petroleum compounds, as carriers for metal oxides to be used as catalysts for hydroforming in the petroleum industry and as anti-acids in the pharmaceutical and other industries.

It should be understood that the present invention is not limited to the exact details hereinabove set out but that it extends to all equivalent reactants, procedures and conditions which will occur to those skilled in the art upon consideration of the general teachings set out herein and the scope of the claims appended hereto.

We claim:

1. A process for the production of polymeric aluminum oxide hydroxides which comprises first forming a polymeric aluminum oxide alcoholate by reacting water with an aluminum alcoholate of an hydroxy hydrocarbon volatilizable from the aluminum product ultimately formed by the herein specified process, in a molar proportion of 0.5–1:1, respectively, at a temperature of at least about 60° C. while preventing not more than the stated proportion of water to come into contact with the alcoholate in any part of the reacting mass, continuing the reaction until liberation of alcohol by partial hydrolysis of the aluminum alcoholate ceases, then adding additional water in an amount providing a total proportion of from 2 to about 2.5 mols per mol of alcoholate initially used, reacting the resulting mixture at a temperature above about 60° C. at which reaction occurs with liberation of hydroxy hydrocarbon derived from the remaining alcoholate groups in said polymeric aluminum oxide alcoholate, and continuing the heating until liberated hydroxy hydrocarbon no longer distills off thereby forming the polymeric aluminum oxide hydroxide.

2. A process for the production of polymeric aluminum oxide hydroxides which comprises forming a polymeric aluminum oxide alcoholate by adding water in a proportion of 0.5–1:1 mols to, and intimately dispersing the same in, an aluminum alcoholate of an hydroxy hydrocarbon volatilizable from the aluminum product ultimately formed by the herein specified process, while maintaining the alcoholate at a temperature of at least about 60° C., reacting the water and alcoholate at a rate avoiding local areas of excess water, continuing the reaction until liberation of alcohol by partial hydrolysis of the aluminum alcoholate ceases, then adding additional water in an amount providing a total proportion of from 2 to about 2.5 mols per mol of alcoholate initially used, reacting the resulting mixture at a temperature above about 80° C. at which reaction occurs with liberation of hydroxy hydrocarbon derived from the remaining alcoholate groups in said polymeric aluminum oxide alcoholate, and continuing the heating until liberated hydroxy hydrocarbon no longer distills off, thereby forming the polymeric aluminum oxide hydroxide.

3. A process for the production of polymeric aluminum oxide hydroxides which comprises forming a polymeric aluminum oxide alcoholate by reacting in a dispersed system, water and an aluminum alcoholate of an alcohol having 2–5 carbon atoms, in the proportion of 0.5–1:1 respectively, at a temperature of at least about 60° C. by adding the water to the alcoholate while the reaction mass is agitated and maintained at said temperature, continuing the reaction until liberation of alcohol by partial hydrolysis of the aluminum alcoholate ceases, then adding additional water in an amount providing a total proportion of from 2 to about 2.5 mols per mol of alcoholate initially used, reacting the resulting mixture at a temperature above about 80° C. at which reaction occurs with liberation of an alcohol derived from the remaining alcoholate groups in said polymeric aluminum oxide alcoholate, and continuing the heating until liberated alcohol no longer distills off, thereby forming the polymeric aluminum oxide hydroxide.

4. A process for the production of polymeric aluminum oxide hydroxides which comprises, reacting water and an aluminum alcoholate of an alcohol having 2–5 carbon atoms, in the proportion of 0.5–1:1 respectively, at a temperature of at least about 60° C. by adding the water to a hot solution of the alcoholate in an inert solvent during agitation whereby the water is dispersed throughout the alcoholate solution until it is reacted, continuing the heating until liberation of alcohol by partial hydrolysis of the aluminum alcoholate ceases, then adding additional water in an amount providing a total proportion of from 2 to about 2.5 mols per mol of alcoholate initially used, reacting the resulting mixture at a temperature above about 80° C. at which reaction occurs with liberation of an alcohol derived from the remaining alcoholate groups, and continuing the heating until liberated alcohol no longer distills off, thereby forming the polymeric aluminum oxide hydroxide.

5. A process for the production of hydroxy aluminum oxide polymers from aluminum alkoxides of alcohols of 2–5 carbon atoms which comprises, dispersing water as it is added to a body of said alkoxide while the latter is maintained at a temperature of at least 60° C., the mol water:alkoxide ratio being 0.5–1:1, continuing the heating until liberation of alcohol by partial hydrolysis of the aluminum alkoxide ceases, then adding additional water in an amount providing a total proportion of from 2 to about 2.5 mols per mol of alkoxide initially used, reacting the resulting mixture at a temperature above about 80° C. at which reaction occurs with liberation of an alcohol derived from the remaining alkoxide groups, and continuing the heating until liberated alcohol no longer distills off, thereby forming the polymeric aluminum oxide hydroxide.

6. A process for the production of hydroxy aluminum oxide polymers from aluminum alkoxides of alcohols of 2–5 carbon atoms which comprises, reacting water with said alkoxide in the presence of an inert solvent for said alkoxide under reflux by a procedure including adding the water in solution in an alcohol to said alkoxide solution during agitation, at a rate below that at which any lumps form in the reaction mass, continuing the heating until liberation of alcohol by partial hydrolysis of the aluminum alkoxide ceases, then adding additional water in an amount providing a total proportion of from 2 to about 2.5 mols per mol of alkoxide initially used, reacting the resulting mixture at a temperature above about 80° C. at which reaction occurs with liberation of an alcohol derived from the remaining alkoxide groups, and continuing the heating until liberated alcohol no longer distills off, thereby forming the polymeric aluminum oxide hydroxide.

7. A process for the production of hydroxy aluminum oxide polymers from aluminum alkoxides of alcohols of 2–5 carbon atoms which comprises, heating under reflux a solution of said alkoxide in a lower molecular weight alcohol, introducing water also in solution in a lower molecular weight alcohol slowly into said alkoxide solution during agitation, the water:alkoxide ratio being 0.5–1:1, continuing the heating until liberation of alcohol by partial hydrolysis of the aluminum alkoxide ceases, then adding additional water in an amount providing a total proportion of from 2 to about 2.5 mols per mol of alkoxide initially used, reacting the resulting mixture at a temperature above about 80° C. at which reaction occurs with liberation of remaining alkoxide groups in the form of an alcohol, and continuing the heating until alcohol no longer distills off, thereby forming the polymeric aluminum oxide hydroxide.

8. A process for the formation of hydroxy aluminum oxide polymers which comprises, heating under reflux a solution of aluminum isopropoxide in isopropanol, introducing water also in solution in isopropanol slowly into said isopropoxide solution during agitation, until 0.5–1 mol per mol of isopropoxide has been added, continuing the heating until liberation of alcohol by partial hydrolysis of the aluminum isopropoxide ceases, then adding additional water in an amount providing a total proportion of from 2 to about 2.5 mols per mol of alkoxide initially used, reacting the resulting mixture at a temperature above about 80° C. at which reaction occurs with liberation of remaining alkoxide groups in the form of an alcohol, continuing the heating until no more isopropanol is liberated and until all isopropanol has been distilled off thereby forming the hydroxy aluminum oxide polymer.

9. The process specified in claim 1 wherein the mol ratio of water to alcoholate in the initial reaction stage is 1:2 and in the second reaction stage is 4:2 also in relation to the initial alcoholate treated.

10. The process specified in claim 1 wherein the mol ratio of water to alcoholate in the initial reaction stage is 2:3 and in the second reaction stage is 5:3 also in relation to the initial alcoholate treated.

11. A process for the production of cyclic trimeric aluminum oxide trihydroxide which comprises, reacting in a dispersed system a cyclic trimeric aluminum oxide alkoxide with water in a mol ratio of 1:3 by slowly introducing dispersed water into the dispersed alkoxide during agitation and heating the latter to a temperature of at least about 60° C., continuing the heating and reacting at a final temperature which liberates alcohol and distills it off, leaving the reaction product composed of the cyclic trimeric aluminum oxide trihydroxide.

12. Cyclic trimeric aluminum oxide trihydroxide.

13. Mixtures of polymeric aluminum oxide hydroxides of the formula

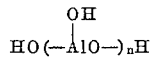

wherein $n$ is at least 2, produced by first forming polymeric aluminum oxide alcoholates by reacting water with an aluminum alcoholate of an hydroxy hydrocarbon volatilizable from the aluminum product ultimately formed, in a molar proportion of 0.5–1:1, respectively, at a temperature of at least about 60° C. while preventing not more than the stated proportion of water to come into contact with the alcoholate in any part of the reacting mass, continuing the reaction until liberation of alcohol by partial hydrolysis of the aluminum alcoholate ceases, then adding additional water in an amount providing a total porportion of from 2 to about 2.5 mols per mol of alcoholate initially used, reacting the resulting mixture at a temperature above about 60° C. at which reaction occurs with liberation of hydroxy hydrocarbon derived from the remaining alcoholate groups of said polymeric aluminum oxide alcoholates, and continuing the heating until liberated hydroxy hydrocarbon no longer distills off, thereby forming said mixtures of polymeric aluminum oxide hydroxides.

References Cited in the file of this patent

UNITED STATES PATENTS

| | | |
|---|---|---|
| 2,744,074 | Theobald | May 1, 1956 |
| 2,805,920 | Richardson | Sept. 10, 1957 |
| 2,889,268 | Dinwiddie et al. | June 2, 1959 |

FOREIGN PATENTS

| | | |
|---|---|---|
| 760,081 | Great Britain | Oct. 31, 1956 |